(12) United States Patent
Carroll et al.

(10) Patent No.: US 7,127,674 B1
(45) Date of Patent: Oct. 24, 2006

(54) SYSTEM AND METHOD FOR MANAGING DOCUMENTS HAVING FORMULA BASED DOCUMENTS LINKS

(75) Inventors: Michael E. Carroll, Westford, MA (US); Matthew P. Siess, Amesbury, MA (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 09/450,558

(22) Filed: Nov. 30, 1999

(51) Int. Cl.
*G06F 15/00* (2006.01)
*G06F 17/00* (2006.01)

(52) U.S. Cl. ............ 715/530; 715/513; 715/515; 715/530; 715/540

(58) Field of Classification Search ............ 715/513, 715/515, 530, 538, 540, 736, 753, 771, 778; 345/736, 753, 771, 778; 709/313, 317, 318
See application file for complete search history.

(56) References Cited

U.S. PATENT DOCUMENTS

| | | | |
|---|---|---|---|
| 5,659,676 A * | 8/1997 | Redpath ............... 715/515 |
| 5,805,886 A * | 9/1998 | Skarbo et al. .......... 709/318 |
| 5,889,945 A * | 3/1999 | Porter et al. .......... 709/204 |
| 5,987,480 A * | 11/1999 | Donohue et al. ....... 715/501.1 |
| 5,990,931 A * | 11/1999 | Nimri et al. ........... 348/14.08 |
| 5,991,782 A * | 11/1999 | Miyagawa et al. ...... 715/513 |
| 6,006,242 A * | 12/1999 | Poole et al. ........... 715/531 |
| 6,021,202 A * | 2/2000 | Anderson et al. ....... 705/54 |
| 6,031,989 A * | 2/2000 | Cordell ................ 717/109 |
| 6,192,382 B1 * | 2/2001 | Lafer et al. ............ 715/513 |
| 6,226,648 B1 * | 5/2001 | Appleman et al. ....... 707/102 |
| 6,331,864 B1 * | 12/2001 | Coco et al. ............ 345/763 |
| 6,397,231 B1 * | 5/2002 | Salisbury et al. ....... 715/515 |
| 6,442,651 B1 * | 8/2002 | Crow et al. ............ 711/118 |
| 6,573,911 B1 * | 6/2003 | Brockbank ............ 345/753 |
| 6,574,674 B1 * | 6/2003 | May et al. ............. 709/313 |
| 6,598,094 B1 * | 7/2003 | Wollrath et al. ........ 709/330 |

OTHER PUBLICATIONS

World Wide Web Consortium, HTML 3.2 Reference Specification, W3C Recommendation Jan. 14, 1997, pp. 1-7, found online on Mar. 18, 2003 at www.w3.org/TR/REC-html32.*
Cate Richards, Using Lotus Notes 4.5 (Que: 1997), p. 9.*

* cited by examiner

*Primary Examiner*—William Bashore
*Assistant Examiner*—Chau Nguyen
(74) *Attorney, Agent, or Firm*—Pillsbury Winthrop Shaw Pittman, LLP

(57) ABSTRACT

A system, method, and computer usable medium having computer readable code embodied therein for causing a computer to create, store, and retrieve a main document with a formula that determines a reference to an insert document for inclusion in the main document. The system includes a data storage mechanism for storing the main document with a reference to an insert document and a shared resource database for storing one or more insert documents that may be referenced within a main document. A document destination module enables a user to create and store a main document with the formula or reference. That module also enables a user to open the main document and, upon opening the main document, extracts the formula and resolves the reference to the insert document. A document retrieval module then uses the reference to retrieve the insert document and a document insertion module then inserts the insert document into the main document.

15 Claims, 9 Drawing Sheets

SYSTEM AND METHOD FOR MANAGING DOCUMENTS HAVING FORMULA BASED DOCUMENTS LINKS

FIELD OF THE INVENTION

This invention relates to a system and method for presenting a document with a formula based link to another document.

BACKGROUND OF THE INVENTION

Current computer systems store data in files. A stored data collection is often called a document. A document may comprise many different types of data formats, such as text, bitmaps, hypertext links, and other types of data. For example, a document created by a word processing program may comprise text and one or more images. Current systems provide mechanisms for incorporating images into documents for storage and retrieval by various user programs such as word processing, spreadsheet, and web browser programs, among others. The text and image portions of the document are stored together as a single main document.

Because images stored as bitmaps require a large amount of data, storing images with a document causes the main document to be voluminous. If multiple documents refer to the same image, then the system stores multiple copies of the same image, resulting in an unnecessary use of disk space. Accordingly, to reduce disk space required to store a document with an image incorporated therein, some current programs enable a user to use a link to select the image to insert in a main document. The link is then stored with the document, reducing the size of the document.

Current systems also enable an image that is referenced in a document to be changed. In order for those changes to be reflected in an open document, some current systems incorporate a program into the document that runs whenever the document is opened. That program then looks at the referenced image and updates the image within the document whenever the image is changed. The incorporation of such a program into the document again causes that document to be large and requires a great amount of disk space.

Additionally, current systems insert images and other objects into documents as a separate block of data. That inserted block of data is treated like a character. There are drawbacks to this treatment of images and other inserted objects into documents.

Other drawbacks also exist with current systems.

SUMMARY OF THE INVENTION

Accordingly, it is an object of the present invention to overcome these and other drawbacks of current systems.

It is another object of the present invention to reduce the amount of disk space required to store documents that incorporate other documents, such as images.

It is another object of the present invention to enable efficient dynamic changes to documents having other documents incorporated therein. It is yet another object of the present invention to enable multiple documents to reference documents from a shared resource database.

It is another object of the present invention to enable formula-based referencing to documents for presentation as the background portion of another document.

It is still another object of the present invention to permit efficient dynamic inclusion of documents within another document.

According to an embodiment of the present invention, a system, method, and computer usable medium are provided that permit a main document to contain a reference to an insert document. Every time the main document is opened, the reference is used to retrieve the insert document and incorporate the contents of the insert document into the main document. The insert document may be stored on a shared resource database that may be accessed by multiple systems. The main document may not store the insert document itself and therefore the amount of disk space required to save the document is reduced. Further, a program for updating the insert document need not be incorporated into the main document.

The database in which the insert document is stored may be a distributed database system that contains databases that are replicated to other databases throughout a networked environment. User systems connected to this networked environment may therefore rely on a shared collection of such documents for reference and inclusion in main documents throughout the system.

Further, the reference in the main document may comprise a formula that determines which of a plurality of insert documents is to be included in the main document. Accordingly, the main document may be dynamically changed to include different insert documents depending on the results of the formula. For example, a user may desire to include a different image as a background for one or more cells of a table based on the day of the week. Each time the table is opened, the formula may determine the day of the week and the image to be inserted based on that determination. Further, the formula may continuously be resolved so that the insert document included within a main document may change even while the main document is opened and in use.

According to one embodiment, a system, method, and computer usable medium containing computer readable code are provided. The system enables a user to create, store, and retrieve a main document with a reference to an insert document for inclusion in the main document. The system comprises a data storage mechanism that stores one or more main documents having a reference to an insert document and a shared resource database. The database is accessible by a plurality of user systems for storing one or more insert documents that may be referenced within a main document. A document destination module enables a user to create and store a main document with one or more references. The document destination module also enables a user to open the main document and, upon opening the main document, extract the reference to the insert document. A document retrieval module then uses the reference to retrieve the insert document and a document insertion module inserts the insert document into the main document. The reference may also be a formula whereby a formula resolution module resolves the formula to derive a value for the reference.

Other advantages of the present invention will be apparent from reviewing the detailed description and drawings of the present invention set forth herein.

DETAILED DESCRIPTION OF THE PRESENT INVENTION

According to an embodiment of the present invention, a system, method, and computer usable medium is provided for dynamic retrieval of insert documents for inclusion in a main document. Retrieval may be based on the result of a resolution of a formula imbedded in the main document that determines the insert document to be included. Further, insert documents eligible to be retrieved may be stored in a shared resource database and may be available to multiple user systems connected via a network to the database. Additionally, the insertion point of the insert document may comprise the background of the main document or the background of a portion of the main document, such as the background of a table or cells of a table or the background of a form, for example. Other text or information may be imposed on the insert document.

Figure 1:
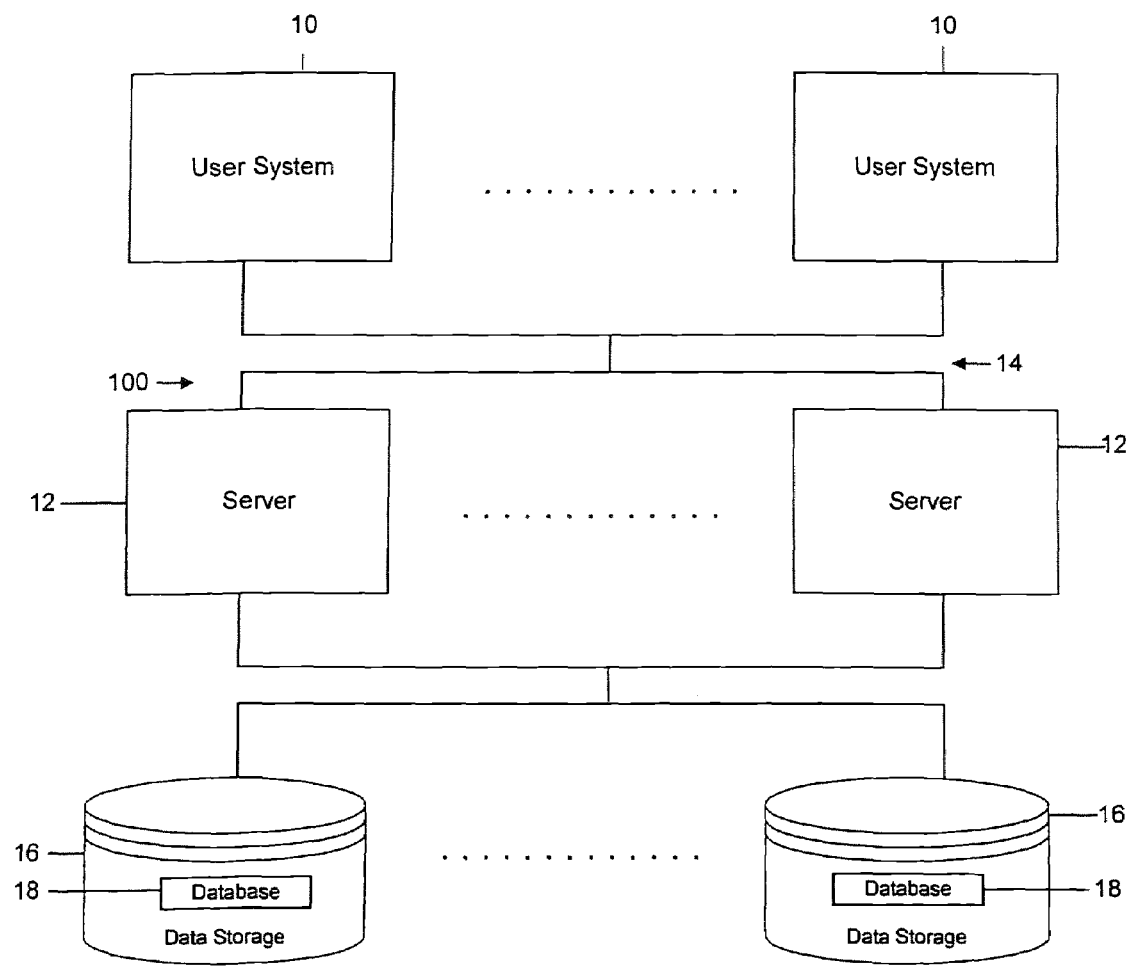
FIG. 1 is a computer system according to an embodiment of the present invention.

FIG. 1 depicts a system 100 according to one embodiment of the present invention. System 100 may comprise one or more user systems 10, one or more servers 12, and one or more data storage mechanisms 16. User systems 10, servers 12, and data storage mechanisms 16 may be connected over a network 14. Accordingly, every user system 10 may be connected to every server 12 which may be connected to every data storage mechanism 16. Other arrangements between user systems 10, servers 12, and data storage mechanisms 16 may also be provided. User system 10 may comprise any computer system such as a personal computer, a notebook computer, a portable electronic device, or a mainframe computer, for example. User system 10 preferably has some internal memory and a processor to operate stored modules as described in detail below.

Server 12 may comprise any server for retrieving information from data storage mechanism 16. According to one embodiment of the present invention, server 12 may comprise a server which is part of a distributed database resource management system licensed by Lotus Development Corporation under the name Lotus Notes™. Server 12 may also comprise a server licensed by Lotus Development Corporation under the name Lotus Domino™. Server 12 may also comprise any other type or brand of server.

Data storage mechanism 16 may comprise any data storage mechanism. Data storage mechanism 16 preferably comprises a data storage mechanism capable of storing large amounts of data and serving a plurality of user systems. Data storage mechanism 16 may comprise one or more databases 18.

Database 18 may comprise any type of database, but preferably comprises a database of the type provided by Lotus Notes™. Database 18 may be any database capable of storing a wide variety of data formats, including text main documents, HTML documents, images, voice data, and a variety of other document formats. Database 18 may be a shared resource database that contains all of the insert documents available for referencing in a main document. According to another embodiment, the available insert documents may be distributed between several databases that are available to a plurality of user systems. As a shared resource database, a plurality of user systems 10 may have access to the contents of this database.

As used herein, the term insert document should be understood to include data that may be inserted into a main document that may in turn be opened by a computer system for a user. Such documents may include bitmaps, voice, movies, images, pictures, HTML, applets, text, clip art, sound, MIDIs, and other data available for inclusion in a main document. Essentially, the term insert document as used herein may be understood to be any separable portion of a main document.

Further, the term main document as used herein should be understood to include data that may be stored in a database and retrieved for use and/or presentation by a computer system. A main document may comprise text, a spreadsheet, a database record, an HTML document or any other document into which another document may be referenced and inserted for presentation.

Figure 2:
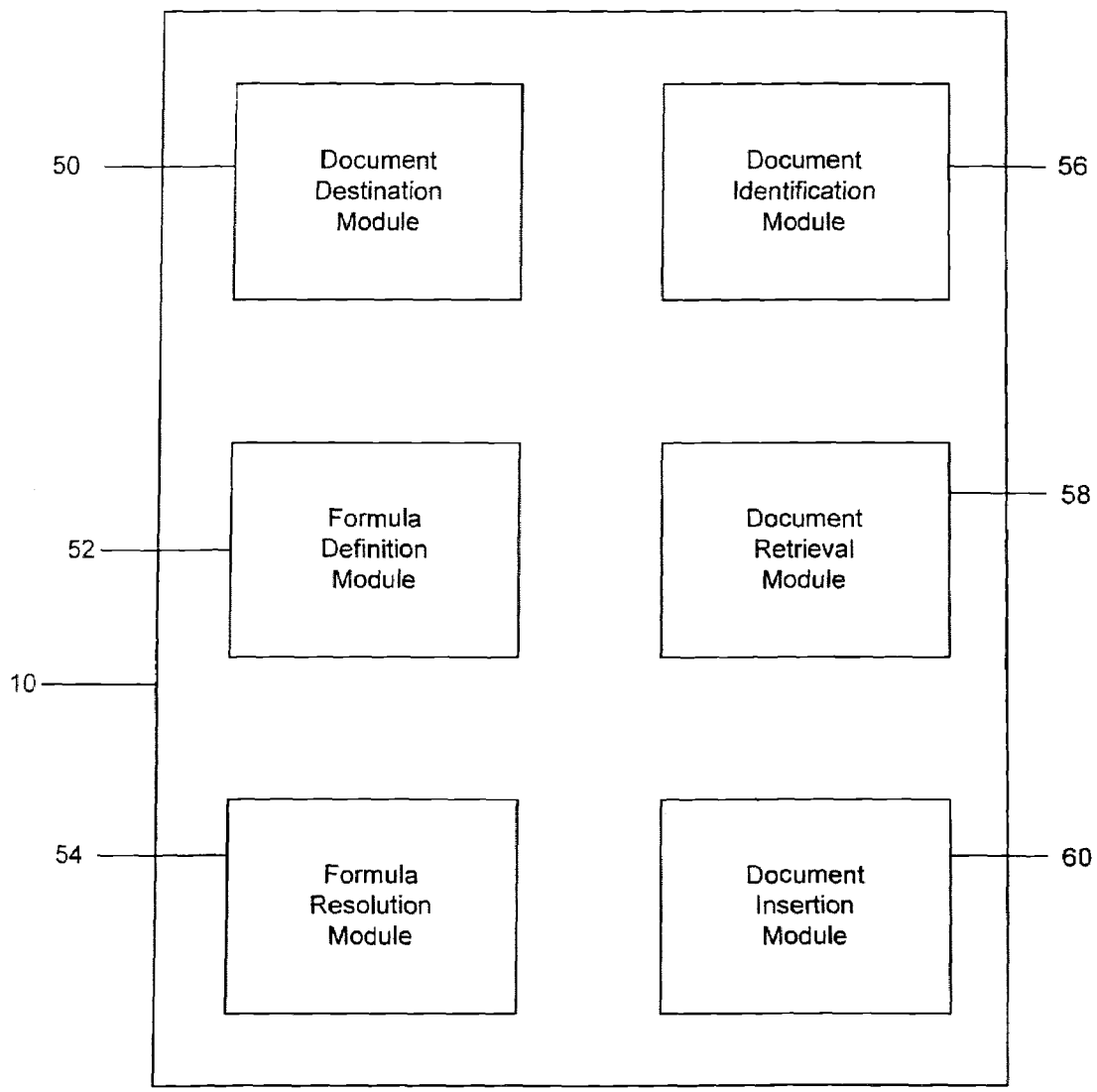
FIG. 2 depicts a schematic of a user system according to an embodiment of the present invention.

FIG. 2 depicts an embodiment of a user system 10 according to the present invention. User system 10 and server 12 may comprise one or more of the following modules: document destination module 50, formula definition module 52, formula resolution module 54, document identification module 56, document retrieval module 58, and document insertion module 60. User system 10 and server 12 may comprise other modules or several of the modules listed above may be provided in a single module. According to one embodiment, document retrieval module 58 may reside on server 12, whereas the other modules may reside on user system 10.

Figure 3:
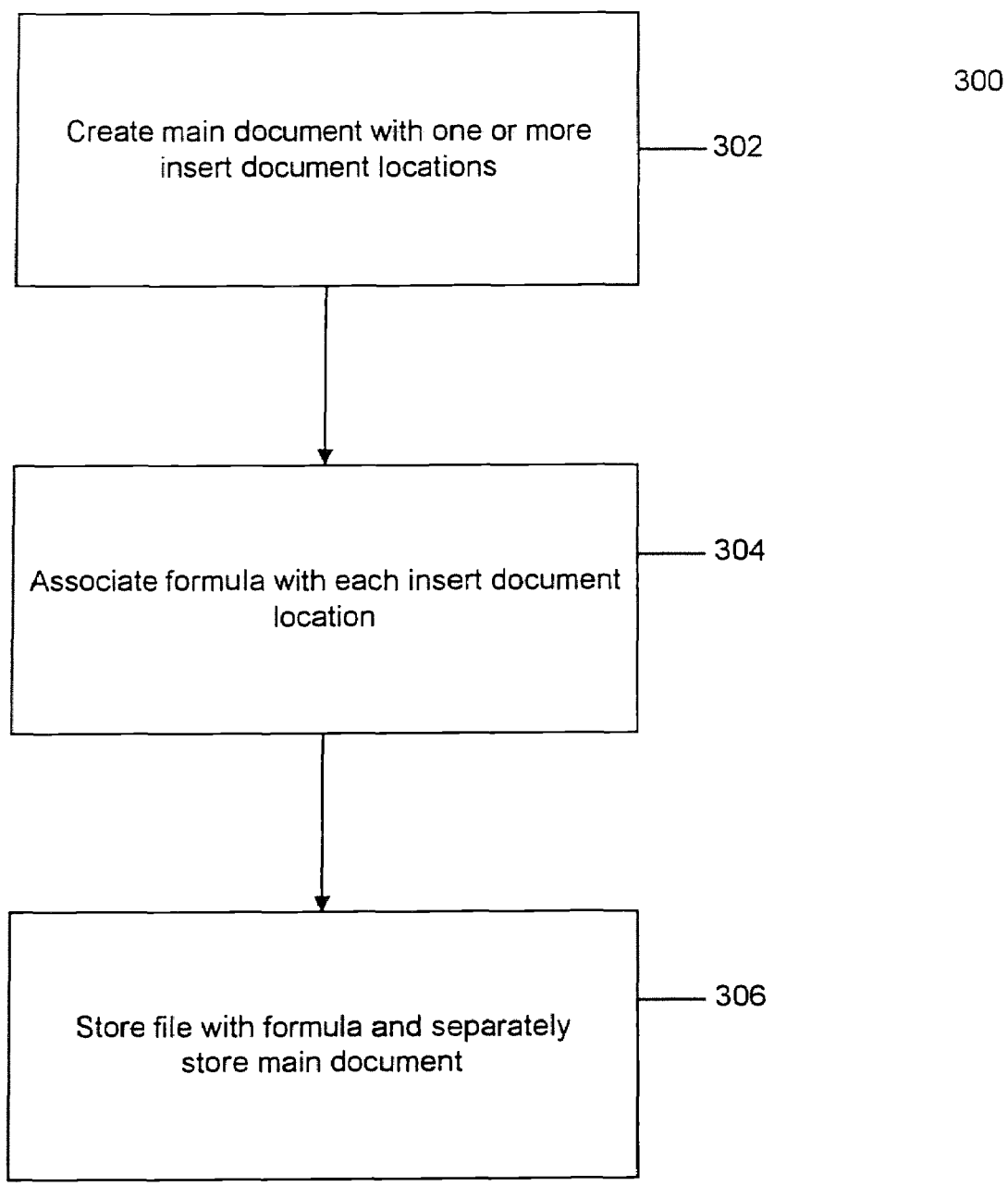
FIG. 3 depicts a flow diagram of a method of creating a main document with an insert document reference according to an embodiment of the present invention.
Figure 4:
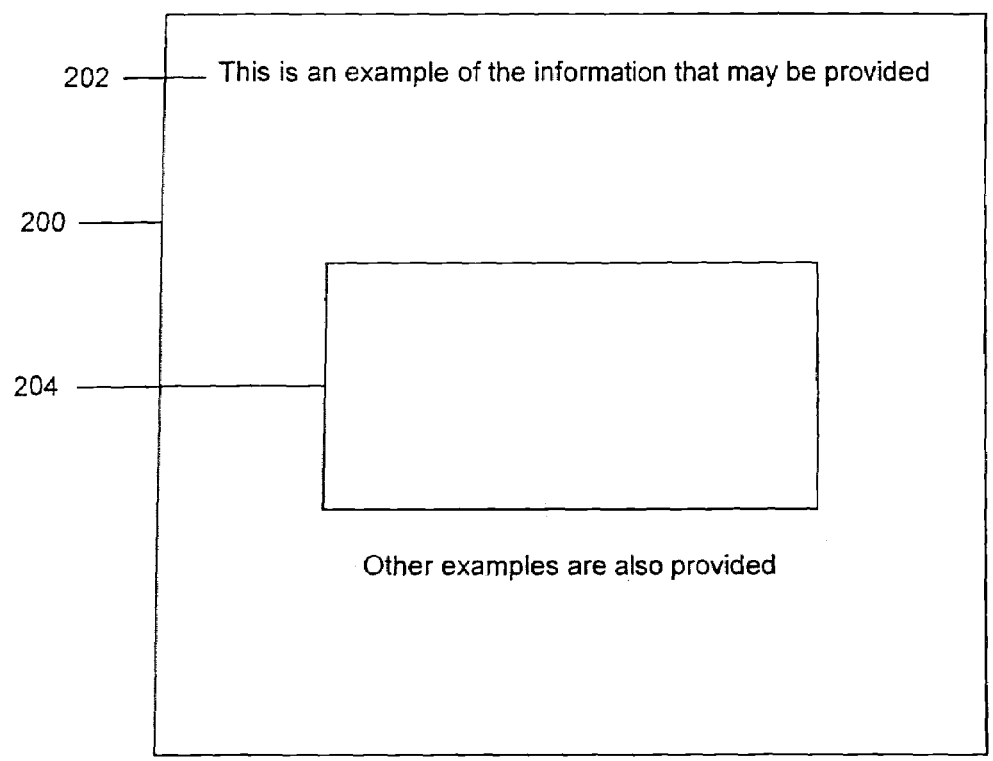
FIG. 4 is an example of a main document according to an embodiment of the present invention.

The operation of each of these modules may be understood with reference to FIGS. 3–7. FIG. 3 depicts a method 300 of creating a main document according to the present invention. Specifically, a user creates a main document with one or more insert document locations in step 302. For example, FIG. 4 depicts a main document 200 having text 202 and a document insertion location 204. Document insertion location 204 may comprise a location for insertion of an image, text, voice, picture, or any other type of insert document.

Figure 5:
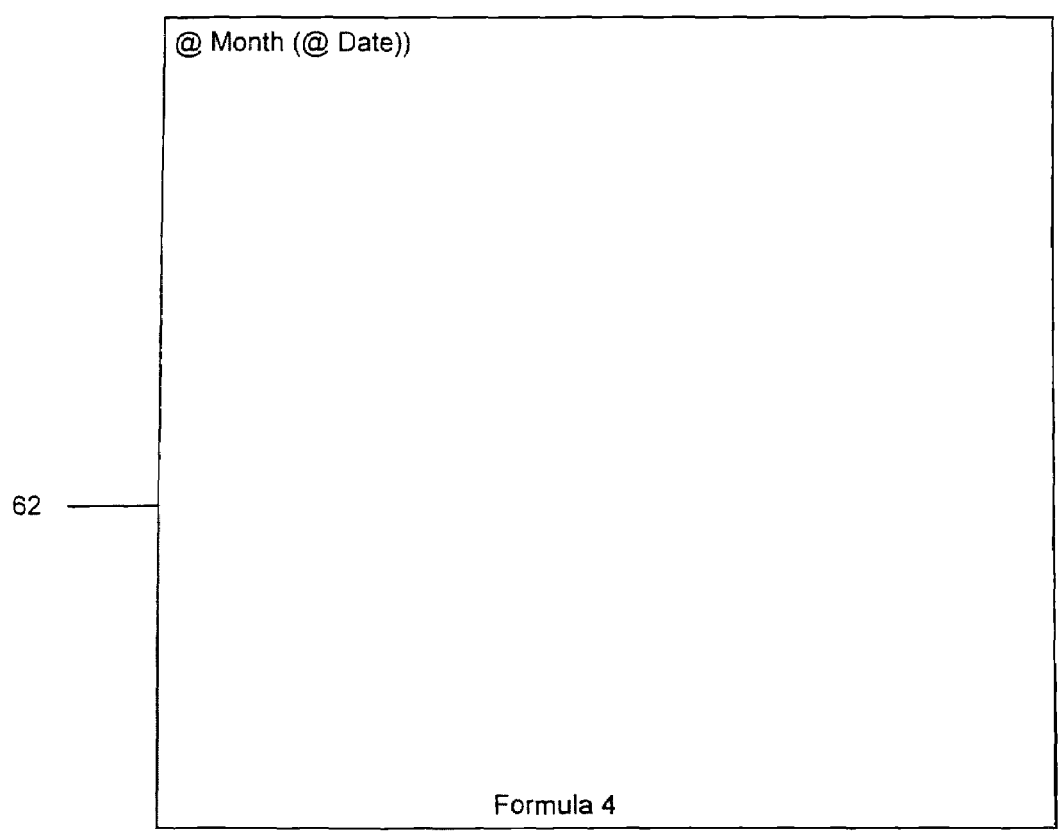
FIG. 5 depicts an example of a formula according to an embodiment of the present invention.

Next, in step 304, a user may create a reference to an insert document to be inserted in main document 200. The reference, or link, may comprise the storage location of the insert document. According to one embodiment of the present invention, the reference may comprise a formula that determines which of a plurality of insert documents to insert into document insertion location 204. FIG. 5 depicts an example of a formula according to an embodiment of the present invention, as described in more detail below.

In step 306, the user stores main document 200 along with a reference or formula. Storage of main document 200 may be performed according to known information storing methods. Insert documents referred to in main document 200 may be separately stored.

Figure 6:
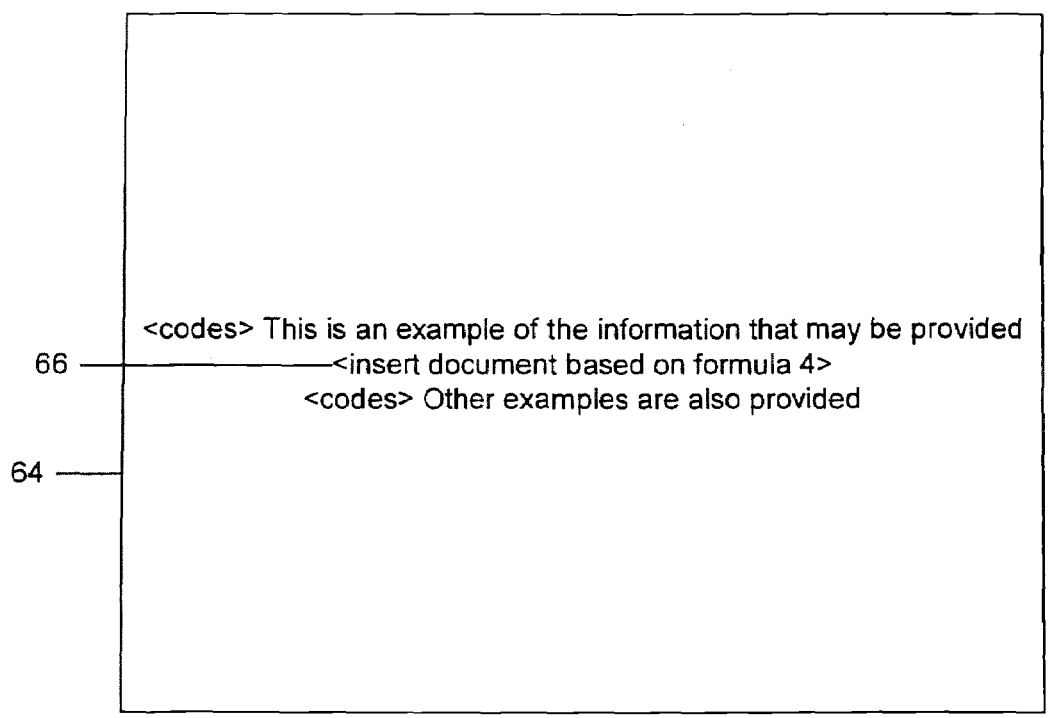
FIG. 6 depicts an example of a stored main document according to an embodiment of the present invention.
Figure 9:
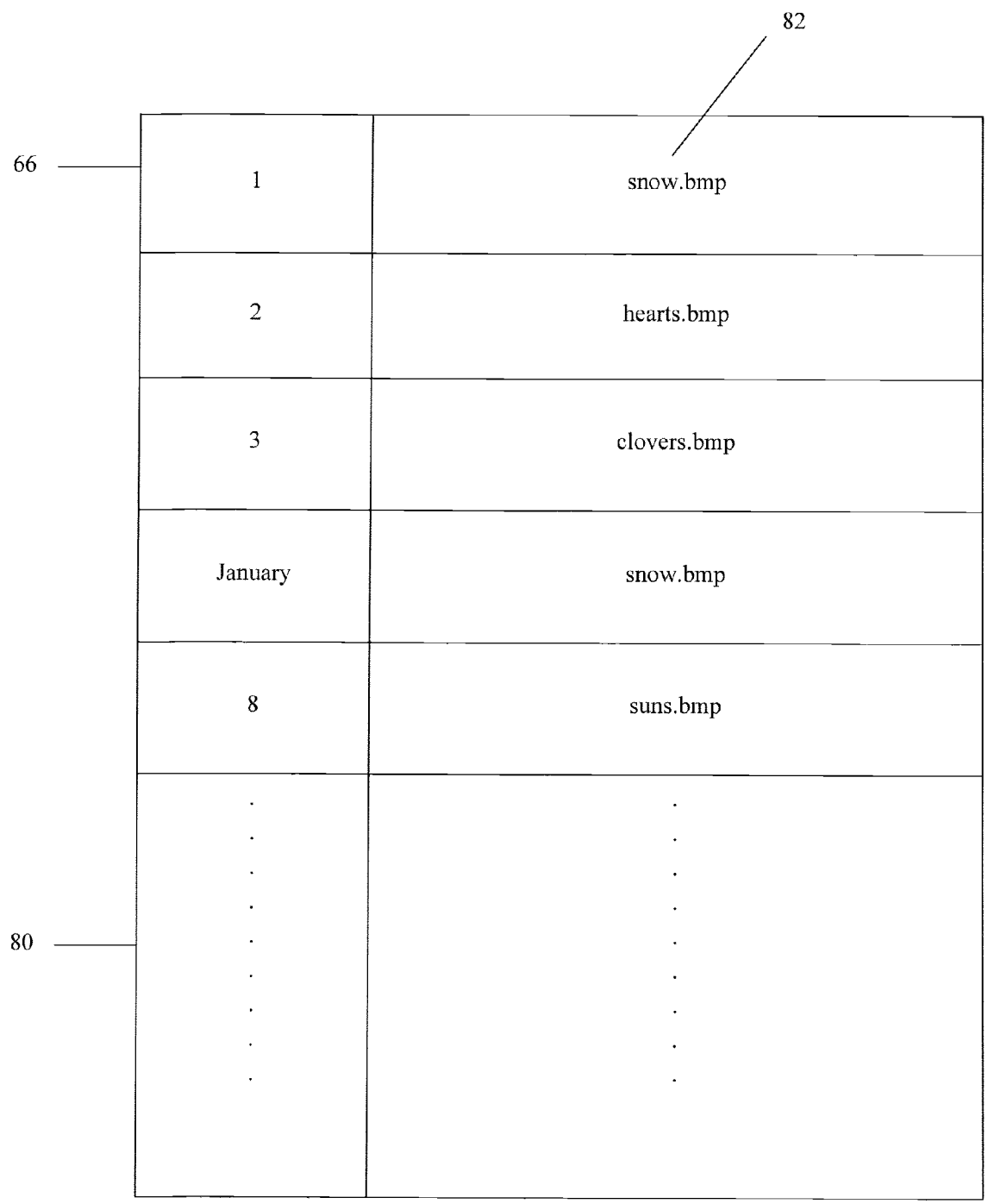
FIG. 9 depicts a document identification database according to an embodiment of the present invention.

FIG. 6 depicts an embodiment of a stored version 64 of main document 200. Stored main document 64 may comprise codes and text from main document 200 and may also include a reference 66. Reference 66 may comprise a direct link to an insert document or may comprise a formula, as for example, the formula of FIG. 5. As depicted in FIG. 9, reference 66 may also comprise numbers or other text according to one embodiment of the present invention.

Accordingly, user system 10 enables a user to create and store main documents 200 with references to insert documents and then open the main and insert documents by using the reference stored in main document 200. According to this embodiment, document destination module 50 may comprise a module that receives a request to open main document 200 containing reference 66 to an insert document. Document destination module 50 may comprise any application program, such as an operating system interface, word processing, spreadsheet, web browser, schedule, or electronic mail program, for example. Document destination module 50 may comprise other programs as well.

Formula definition module 52 may comprise a module that enables a user, in step 304, to define a formula for dynamically determining which of a plurality of insert documents to include in main document 200. Formula definition module 52 may comprise a graphical user interface through which a user may input a formula. According to one embodiment, the formula may comprise a combination of functions and fields. The functions may yield output based on input values. The fields may comprise input values based on information provided by the system, other programs, or other modules, for example.

The formula may output a text output according to one embodiment of the present invention. The text output may then be used to determine which insert document to be included. For example, an insert document table may be provided that indexes text references resolved from formulas to document insertion locations 204 within database 18. A document identification database may be provided, for example, as described in more detail below.

Figure 7:
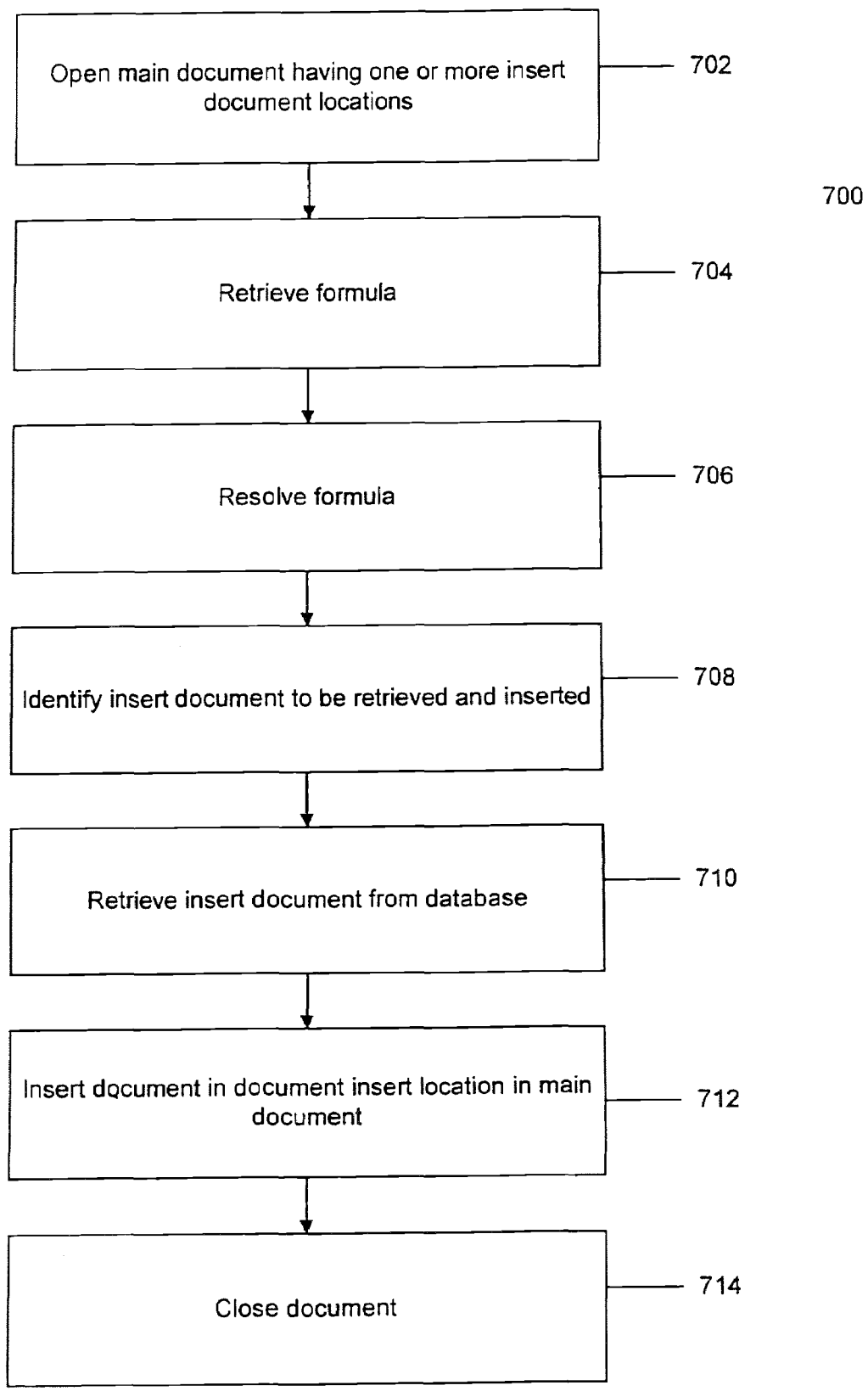
FIG. 7 depicts a method of opening a main document with a referenced insert document according to an embodiment of the present invention.

FIG. 7 depicts a method 700 of opening main document 200 having an insert document reference 66 therein according to one embodiment of the present invention. Method 700 may comprise a plurality of steps.

In step 702, main document 200 having one or more document insertion locations 204 may be opened. Main document 200, such as stored main document 64, may be retrieved from a storage location such as data storage mechanism 16, and opened. The information, other than document insertion location 204 from stored main document 64, may be presented by document destination module 50 to display main document 200. Steps 704–708 may be performed to determine the insert document that is to be retrieved and presented in document insertion location 204. According to one embodiment, reference 66 may be a direct link to a specific insert document to be inserted in document insertion location 204. According to this embodiment, steps 704–708 may be performed by using reference 66 to identify the insert document to be retrieved.

According to another embodiment of the present invention, reference 66 may comprise a formula with an output that determines which of a plurality of insert documents is to be inserted in document insertion location 204. According to this embodiment, in step 204, the formula is retrieved from reference 66 of stored main document 64 by formula resolution module 54. In step 706, formula resolution module 54 resolves the formula and yields a reference. As discussed above, the reference yielded may be text. That text reference may be used in step 708 to identify the insert document to be inserted by document identification module 56 as described below.

In step 710, the insert document identified is retrieved from database 18 by document retrieval module 58. Step 712 inserts the insert document into the document insertion location 204 of main document 200 and presents main document 200 using document insertion module 60. Eventually, in step 714, main document 200 is closed. When main document 200 is closed, according to one embodiment, the insert document is not stored with main document 200. Each time main document 200 is opened, system 10 resolves reference 66 and presents the corresponding insert document. Accordingly, the size of main document 200 is reduced.

As discussed above, system 10 may comprise a formula resolution module 54. Formula resolution module 54 may be a module that, when provided with a formula from document destination module 50, resolves the formula to yield an output. According to one embodiment, the output may be a reference to an insert document within database 18. The output, for example, may comprise text.

Document identification module 56 may comprise a module that utilizes reference 66 from stored main document 64 or a reference generated by formula resolution module 54 to determine an insert document to be retrieved. Document identification module 56 may comprise an indexing program, for example, that indexes a database that stores references and corresponding insert documents. For example, one or more document identification databases 80 may be provided in data storage mechanisms 16 which comprise references 66 and document names 82. Document names 82 may comprise the name of main document 200 stored in database 18 to be retrieved. According to another embodiment of the present invention, reference 66 may comprise the name of an insert document within database 18 and document identification database 80 may not be needed.

Once an insert document name has been determined by document identification module 56, that information may be passed to document retrieval module 58. Document retrieval module 58 may comprise a module that accesses a database and retrieves an insert document identified. Document retrieval module 58 may cooperate with one or more servers 12 according to one embodiment of the present invention. Specifically, document retrieval module 58 may pass the document name to server 12 which may then retrieve the corresponding insert document from database 18 stored on one of data storage mechanisms 16.

According to one embodiment of the present invention, database 18 may comprise a database that contains all available insert documents for retrieval by document retrieval module 58 and insertion by document insertion module 60. Database 18 may comprise a shared resource database such that all user systems 10 on system 100 may have access to the contents of database 18.

Document insertion module 60 may comprise a module that receives the insert document retrieved from document retrieval module 58 and inserts that insert document into document insertion point 204 of main document 200 opened by document destination module 50. Document insertion module 60 may comprise part of a module, such as a word processing, database record modification or other program that inserts documents into main document 200.

According to one embodiment of the present invention, the insertion location of the insert document within main document 200 may comprise a background. The background may be a background of an entire document, one or more cells of a table, one or more sections of a form, an operating system desktop, or any other portion of a document that may have a background. If the insert document is an image or picture, for example, the location may be a background that "fits" in that portion. The background may also be for a button, pop-up window, box or other portion of system 100.

Figure 8A:
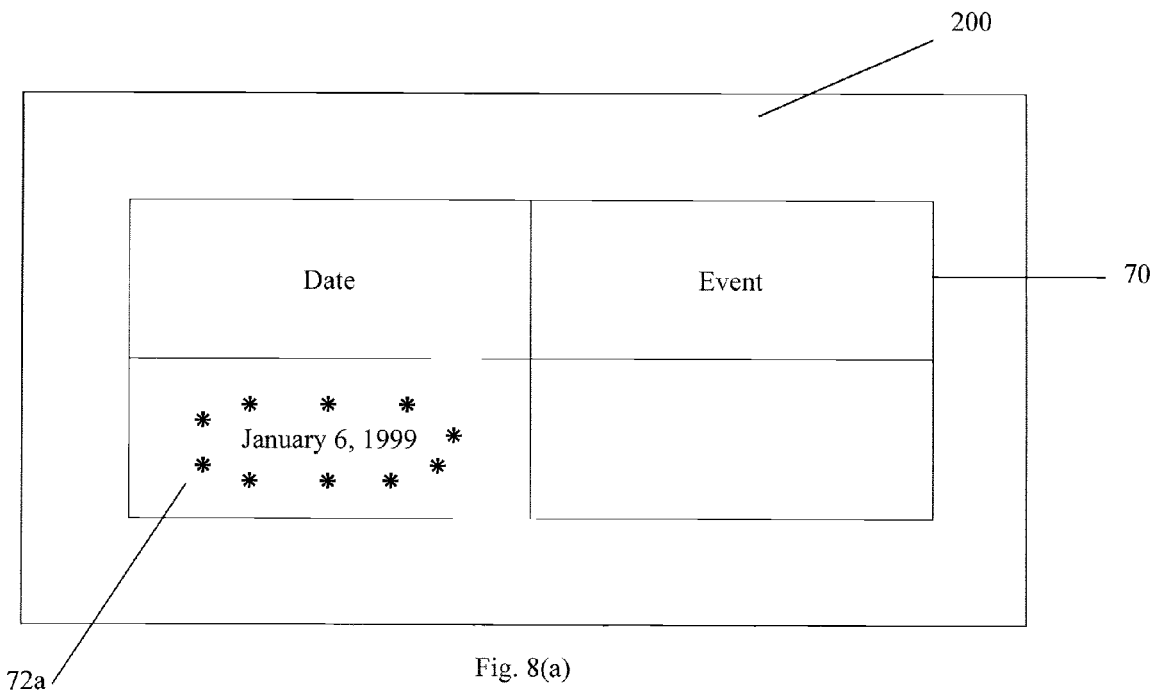
FIGS. 8(a) and (b) depict a main document having different images incorporated therein according to an embodiment of the present invention.
Figure 8B:
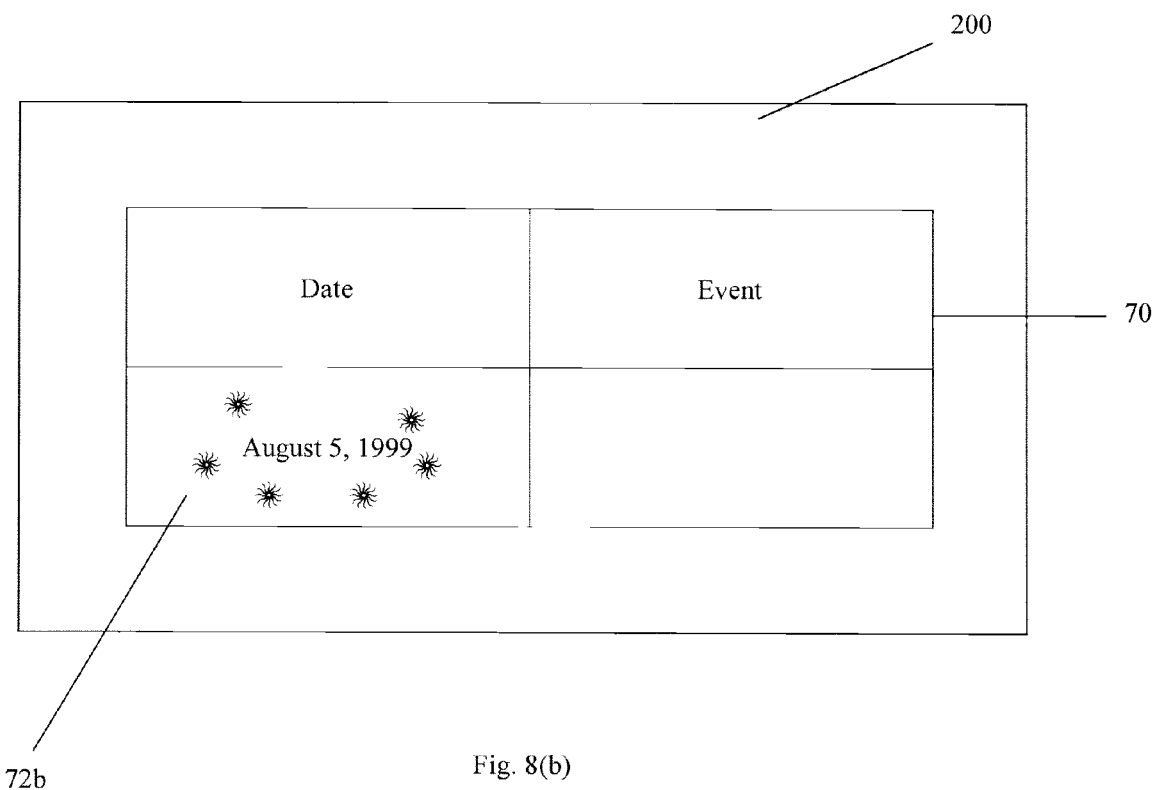

For illustration of how one embodiment of the present invention operates, FIGS. 8(a) and 8(b) depict main document 200 with a different insert document inserted therein based on the date of an entry in a table within main document 200. FIG. 8(a) depicts main document 200 having a table 70. One of the cells within table 70 may comprise a date entry. It may be desirable to have a background 72 for that particular cell to have an image, picture, or sound related to the date presented in the cell. For example, as depicted in FIG. 8(a), for a date in the month of January, a snow background 72a may be appropriate. As depicted in FIG. 8(b), for a date in the month of August, a sun background 72b may be appropriate.

According to one embodiment of the present invention, background 72 for a cell may be based on reference 66. A user may be permitted to select a value for reference 66 through a graphical user interface. Reference 66 may comprise a main document name, or according to this example, may comprise a formula. For example, a formula may be defined based on a function that takes a date and generates a numeric value corresponding to the month of the date. For example, the formula may be Formula 4 as depicted in FIG. 5. Accordingly, the formula may generate the number "1" when the date is Jan. 6, 1999, as in the example of FIG. 8(a) and the number "8" when the date is Aug. 5, 1999.

Formula resolution module 54 therefore takes Formula 4, the listed functions based on the listed fields, and generates a reference, such as the numbers "1" and "8" in the example above. Operation of formula resolution 54 may be according to existing methods of resolving functions such as, for example, provided by Lotus Notes™ through use of LotusScript™ function calls. Other functions and fields may also be used with corresponding function and field determination algorithms. Once an output is generated, formula resolution module 54 then passes the output to document identification module 56. According to one embodiment, document identification module 56 may utilize document identification database 80 to identify the insert document name to be retrieved. For example, for FIG. 8(a), formula resolution module 54 would pass along the output "1" based on Formula 4 and the input Jan. 6, 1999." Document identification module 56 may use the output "1" as an index into a reference field of document identification database 80. The corresponding document name 82 of a background for inclusion in main document 200 of FIG. 8(a) may be provided from document identification database 80. Main document 200 may be titled snow.bmp and display snow in the background as depicted in FIG. 8(a). The text may still be displayed over the background presented. If the number resolved by formula resolution module 54 is "8", then a sun.bmp insert document may be identified and presented as the background for table 70 in main document 200 as in FIG. 8(b).

According to one embodiment of the present invention, user system 10 may comprise a client of a system licensed by Lotus Development Corporation under the name Lotus Notes™. According to this embodiment, database 18 may comprise a Lotus Notes™ database. Servers 12 may comprise a Lotus Notes™ server. Various types of main documents that may be used by the Lotus Notes™ system may include references 66 to insert documents for inclusion. Such main document types may include tables and forms, wherein the background for various cells or portions within the tables and forms may be specified to be a particular image or may be specified by a formula to resolve to an image stored within the Lotus Notes™ database. Each time Lotus Notes™ opens main document 200 for presentation or editing, Lotus Notes™ resolves the reference or formula and retrieves the insert document corresponding thereto. In this way, shared resources are stored once within a distributed database system, but may be used in many different main documents 200. Significant storage savings are thereby provided.

According to another embodiment of the present invention, the insert document that is referenced by main document 200 may comprise a background for a windowing environment, graphics for an icon, content for main document 200, content for a spreadsheet cell, part of a web page, part or all of an electronic mail message, part or all of a broadcast, or any other type of main document 200 in which an insert document may be inserted. The present invention is particularly advantageous for referencing images and other large data collections because main documents 200 may be stored without this additional amount of data.

According to another embodiment of the present invention, formula resolution module 54 may continuously resolve the formula and if a different output is determined, may dynamically and automatically call document identification module 56, document retrieval module 58, and document insertion module 50 to change the insert document that is inserted in an open main document 200. Formula resolution module 54 may provide for a scrolling effect of images within main document 200, for example. This dynamic and automatic resolution may be based on the occurrence of a predetermined event. The predetermined event may comprise the passage of a predetermined period of time, input from a user, or some other definable event. The event may be programmed, such as through LotusScript™. Formula resolution module 54 may thus monitor for the occurrence of one or more predetermined events and resolve the formula when they occur.

According to another embodiment of the present invention, a computer usable medium having computer readable code embodied therein for enabling formula-based referencing to documents within another document may be provided. For example, the computer usable medium may comprise a CD ROM, a floppy disk, a hard disk, or any other computer usable medium. One or more of the modules of user system 10 and/or server 12 may comprise computer readable program code that is provided on the computer usable medium such that when the computer usable medium is installed on a computer system, those modules cause the computer system to perform the functions described.

According to one embodiment, document destination module 50, formula definition module 52, formula resolution module 54, document identification module 56, document retrieval module 58, and document insertion module 60 may comprise computer readable code that, when installed on a computer, perform the functions described above. Also, only some of the above-listed modules may be provided in computer readable code.

According to one specific embodiment of the present invention, system 100 may comprise components of a software system licensed by the Lotus Development Corporation under the names Lotus Notes™ and Lotus Domino Designer™. User system 10 may operate on a network and may be connected to other systems 10 sharing a common database 18. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A system for retrieving a main document with a reference to an insert document for inclusion in the main document comprising:
   a data storage mechanism that stores the main document with a formula that resolves to a reference to an insert document, the insert document including contents for the main document;
   a shared resource database, accessible by a plurality of clients of the system, that stores one or more insert documents that may be referenced within a main document;
   a document destination module that opens the main document and extracts the formula;
      a formula resolution module that resolves the formula to derive a value for the reference;
      a document retrieval module that uses the reference to retrieve the insert document;
      a document insertion module that inserts the insert document into the main document in a document location point specified, wherein the system enables a user to create and store a main document having a reference to an insert document, and wherein the document destination module enables a user to create a main document with a reference to an insert document and stores the main document with the reference separate from the insert document being referenced; and
      a formula definition module that enables a user to define a formula that resolves to a reference to an insert document to be included in the main document.

2. A system for retrieving a main document with a reference to an insert document for inclusion in the main document comprising:
   a data storage mechanism that stores the main document with a formula that resolves to a reference to an insert document, the insert document including contents for the main document;
   a shared resource database, accessible by a plurality of clients of the system, that stores one or more insert documents that may be referenced within a main document;
   a document destination module that opens the main document and extracts the formula;
      a formula resolution module that resolves the formula to derive a value for the reference;
      a document retrieval module that uses the reference to retrieve the insert document; and
      a document insertion module that inserts the insert document into the main document in a document location point specified;
      wherein the document location point comprises a background in the main document.

3. A system for retrieving a main document with a reference to an insert document for inclusion in the main document comprising:
   data storage means for storing the main document with a formula that resolves to a reference to an insert document, the insert document including contents for the main document;
   database means for storing one or more insert documents that may be referenced within a main document;
   formula resolution means for resolving the formula to derive a value for the reference;
   means for retrieving and opening a main document;
   document retrieval means for retrieving the insert document using the reference;
   document insertion means for inserting the insert document into the main document at a document insertion point, wherein the system also enables a user to create and store a main document having a reference to an insert document, and wherein the document destination means comprises (i) means for enabling a user to create a main document with a reference to an insert document and (ii) means for storing the main document with the reference separate from the insert document being referenced; and
   formula definition means for enabling a user to define a formula that resolves to a reference to an insert document to be included in the main document.

4. A system for retrieving a main document with a reference to an insert document for inclusion in the main document comprising:
   data storage means for storing the main document with a formula that resolves to a reference to an insert document, the insert document including contents for the main document;
   database means for storing one or more insert documents that may be referenced within a main document;
   formula resolution means for resolving the formula to derive a value for the reference;
   means for retrieving and opening a main document;
   document retrieval means for retrieving the insert document using the reference; and
   document insertion means for inserting the insert document into the main document at a document insertion point;
   wherein the document location point comprises a background in the main document.

5. A method for managing a main document with one or more insert documents inserted therein comprising the steps of:
   storing the main document with a formula that resolves to a reference to an insert document, the insert document including contents for the main document;
   storing one or more insert documents that may be referenced within a main document;
   retrieving and opening a main document;
   extracting the formula from the main document;
   resolving the formula to the reference to an insert document based on the main document;
   retrieving the insert document; and
   inserting the insert document into the main document at a document location point;
   creating a main document with a reference to an insert document to be included in the main document;
   storing the main document having a reference to an insert document separate from the insert document included in the stored main document; and
   enabling a user to define a formula that resolves to a reference to an insert document to be included in the main document.

6. A computer usable medium having computer readable program code means embodied therein for managing a main document with a reference to one or more insert documents to be included in the main document comprising:
   computer readable program code means for causing a computer to store the main document with a formula that resolves to a reference to an insert document, the insert document including contents for the main document;

computer readable program code means for causing a computer to store one or more insert documents that may be referenced within a main document;

computer readable program code means for causing a computer to extract a formula from the main document;

computer readable program code means for causing a computer to resolve the formula to a reference to an insert document from the main document;

computer readable program code means for causing a computer to retrieve the insert document;

computer readable program code means for causing a computer to insert the insert document into the main document; and computer readable program code means for causing a computer to enable a user to define a formula that resolves to a reference to an insert document to be included in the main document.

7. A system for retrieving a main document with a reference to an insert document for inclusion in the main document comprising:

a data storage mechanism that stores the main document with a formula that resolves to a reference to an insert document, the insert document including contents for the main document;

a shared resource database, accessible by a plurality of clients of the system, that stores one or more insert documents that may be referenced within a main document;

a document destination module that opens the main document and extracts the formula;

a formula resolution module that resolves the formula to derive a value for the reference;

a document retrieval module that uses the reference to retrieve the insert document;

a document insertion module that inserts the insert document into the main document in a document location point specified; and a continuous resolving module that resolves the formula continuously in order to modify the insert document that is inserted in an opened main document.

8. A system for retrieving a main document with a reference to an insert document for inclusion in the main document comprising:

a data storage mechanism that stores the main document with a formula that resolves to a reference to an insert document, the insert document including contents for the main document;

a shared resource database, accessible by a plurality of clients of the system, that stores one or more insert documents that may be referenced within a main document;

a document destination module that opens the main document and extracts the formula;

a formula resolution module that resolves the formula to derive a value for the reference;

a document retrieval module that uses the reference to retrieve the insert document; and a document insertion module that inserts the insert document into the main document in a document location point specified;

wherein the insert document is stored in a first database and the main document is stored in a second database; and wherein the insert document stored in said first database can be modified to a modified insert document, wherein the modified insert document is inserted into the main document in response to user selecting the main document.

9. A system for retrieving a main document with a reference to an insert document for inclusion in the main document comprising:

a data storage mechanism that stores the main document with a formula that resolves to a reference to an insert document, the insert document including contents for the main document;

a shared resource database, accessible by a plurality of clients of the system, that stores one or more insert documents that may be referenced within a main document;

a document destination module that opens the main document and extracts the formula;

a formula resolution module that resolves the formula to derive a value for the reference;

a document retrieval module that uses the reference to retrieve the insert document; and a document insertion module that inserts the insert document into the main document in a document location point specified;

wherein the main document includes a pre-defined portion, said pre-defined portion may be specified to include an insert document representing a background for the main document.

10. A system for retrieving a main document with a reference to an insert document for inclusion in the main document comprising:

a data storage mechanism that stores the main document with a formula that resolves to a reference to an insert document, the insert document including contents for the main document;

a shared resource database, accessible by a plurality of clients of the system, that stores one or more insert documents that may be referenced within a main document;

a document destination module that opens the main document and extracts the formula;

a formula resolution module that resolves the formula to derive a value for the reference;

a document retrieval module that uses the reference to retrieve the insert document; and a document insertion module that inserts the insert document into the main document in a document location point specified;

wherein the formula may be defined based on a function, wherein the function determines a date and generates a link for the determined date; and wherein the link is continuously resolved to a field representing an image for the main document.

11. A method for managing a main document with one or more insert documents inserted therein comprising the steps of:

storing the main document with a formula that resolves to a reference to an insert document, the insert document including contents for the main document;

storing one or more insert documents that may be referenced within a main document;

retrieving and opening a main document;

extracting the formula from the main document;

resolving the formula to the reference to an insert document based on the main document;

retrieving the insert document; and inserting the insert document into the main document at a document location point;

wherein the step of resolving includes continuously resolving the formula in order to modify the insert document that is inserted in an opened main document.

12. A method for managing a main document with one or more insert documents inserted therein comprising the steps of:
- storing the main document with a formula that resolves to a reference to an insert document, the insert document including contents for the main document;
- storing one or more insert documents that may be referenced within a main document;
- retrieving and opening a main document;
- extracting the formula from the main document;
- resolving the formula to the reference to an insert document based on the main document;
- retrieving the insert document; and
- inserting the insert document into the main document at a document location point;
- wherein the insert document is stored in a first database and the main document is stored in a second database; and
- wherein the insert document stored in said first database can be modified to a modified insert document, wherein the modified insert document is inserted into the main document in response to user selecting the main document.

13. A method for managing a main document with one or more insert documents inserted therein comprising the steps of:
- storing the main document with a formula that resolves to a reference to an insert document, the insert document including contents for the main document;
- storing one or more insert documents that may be referenced within a main document;
- retrieving and opening a main document;
- extracting the formula from the main document;
- resolving the formula to the reference to an insert document based on the main document;
- retrieving the insert document; and
- inserting the insert document into the main document at a document location point;
- wherein the main document includes a pre-defined portion, said pre-defined portion may be specified to include an insert document representing a background for the main document.

14. A method for managing a main document with one or more insert documents inserted therein comprising the steps of:
- storing the main document with a formula that resolves to a reference to an insert document, the insert document including contents for the main document;
- storing one or more insert documents that may be referenced within a main document;
- retrieving and opening a main document;
- extracting the formula from the main document;
- resolving the formula to the reference to an insert document based on the main document;
- retrieving the insert document; and
- inserting the insert document into the main document at a document location point;
- wherein the formula may be defined based on a function,
- wherein the function determines a date and generates a link for the determined date, and
- wherein the link is continuously resolved to a field representing an image for the main document.

15. A method for managing a main document with one or more insert documents inserted therein, the method comprising:
- enabling a user to open said main document, said main document stored in a first database, said main document including a formula corresponding to one or more insert documents stored in a second database;
- resolving the formula in order to identify at least one corresponding insert document, said at least one corresponding insert document including contents for said main document;
- retrieving said identified insert document from the second database;
- inserting said identified insert document into said main document at a pre-determined document location point; and
- resolving the formula continuously in order to modify said identified insert document that is inserted in the main document.

* * * * *